(12) United States Patent
Mühlenberg et al.

(10) Patent No.: US 9,454,906 B2
(45) Date of Patent: Sep. 27, 2016

(54) DRIVER ASSISTANCE SYSTEM FOR A VEHICLE

(71) Applicant: Hella KGaA Hueck & Co., Lippstadt (DE)

(72) Inventors: Martin Mühlenberg, Soest (DE); Thomas Wixforth, Gütersloh (DE)

(73) Assignee: Hella KGaA Hueck & Co., Lippstadt (DE)

(*) Notice: Subject to any disclaimer, the term of this patent is extended or adjusted under 35 U.S.C. 154(b) by 78 days.

(21) Appl. No.: 14/086,777

(22) Filed: Nov. 21, 2013

(65) Prior Publication Data

US 2014/0152473 A1    Jun. 5, 2014

(30) Foreign Application Priority Data

Nov. 23, 2012    (DE) ..................... 10 2012 111 318

(51) Int. Cl.
- *B60Q 1/00* (2006.01)
- *G08G 1/16* (2006.01)
- *G01S 7/28* (2006.01)
- *G01S 13/93* (2006.01)

(52) U.S. Cl.
CPC ............. *G08G 1/166* (2013.01); *G01S 7/2813* (2013.01); *G01S 2013/9332* (2013.01); *G01S 2013/9371* (2013.01)

(58) Field of Classification Search
CPC ........................................ G08G 1/166
USPC ............... 340/903, 435, 932.2; 701/301
See application file for complete search history.

(56) References Cited

U.S. PATENT DOCUMENTS

| | | | | |
|---|---|---|---|---|
| 5,463,384 A | * | 10/1995 | Juds | 340/903 |
| 7,504,986 B2 | * | 3/2009 | Brandt et al. | 342/70 |
| 2006/0176160 A1 | * | 8/2006 | Zoratti et al. | 340/435 |
| 2010/0245065 A1 | * | 9/2010 | Harada et al. | 340/435 |
| 2010/0271238 A1 | | 10/2010 | Reed et al. | |
| 2011/0241857 A1 | * | 10/2011 | Brandenburger et al. | 340/435 |
| 2012/0277989 A1 | * | 11/2012 | Zeller et al. | 701/301 |

FOREIGN PATENT DOCUMENTS

| | | |
|---|---|---|
| DE | 19628125 A1 | 1/1998 |
| DE | 102010003646 A1 | 10/2011 |
| DE | 102010064346 A1 | 7/2012 |
| EP | 1506432 B1 | 8/2007 |

* cited by examiner

*Primary Examiner* — Brent Swarthout
(74) *Attorney, Agent, or Firm* — Husch Blackwell LLP

(57) ABSTRACT

A driver assistance system for a vehicle for monitoring cross-traffic includes a transmitting device for transmitting electromagnetic signals and operable for monitoring a kidney-shaped area in both a first monitoring direction and in a second monitoring direction and a receiving device for receiving electromagnetic signals.

18 Claims, 3 Drawing Sheets

DRIVER ASSISTANCE SYSTEM FOR A VEHICLE

CROSS REFERENCE

This application claims priority to German Patent Application No. 10 2012 111318.1, filed Nov. 23, 2012.

TECHNICAL FIELD OF THE INVENTION

This invention relates to a driver assistance system for monitoring cross-traffic and to a vehicle that exhibits at least one driver assistance system for monitoring said cross-traffic.

BACKGROUND OF THE INVENTION

Driver assistance systems for vehicles are generally known and established. For example, radar-based transmitters and receivers are commonly used to monitor the area immediately surrounding a vehicle for obstacles. Sensors like these are used e.g. in assistance systems for parking control, distance warning, and lane departure. It is also already established that sensors such as these scan so-called monitoring areas, also known as lobes. EP 1 506 432 B2, for example, is a sensor that generates not only one but two such lobes. In the current state of technology, these are known as the main lobe and the side lobe. They are used to monitor a vehicle's "blind spot" and, by way of distinction, also the rear of the vehicle.

The disadvantage with established driver assistance systems is that they have a "focused" monitoring area without any overlap. The description of the EP 1 506 432 B2 states, for example, that because the individual lobes fail to overlap, an unmonitored dead zone or "blind spot" exists between the two lobes. In established applications, e.g. a system for monitoring a vehicle's blind spot and/or the area immediately behind the vehicle, this dead zone is of no great relevance in terms of the vehicle's operational safety. But if the aim is to monitor cross-traffic emerging to the front, the rear or the sides of a vehicle, i.e. traffic flowing at an angle, notably at right angles to the vehicle's own path, this dead zone can pose a safety risk. In particular, a solution of this kind should be able to monitor cross-traffic with a high degree of accuracy from the moment it emerges to the point where it disappears from the vehicle's path again. Current driver assistance systems are only partly capable of satisfying these criteria, as they are unable to continuously monitor cross-traffic from the point where it emerges on one side of the vehicle and passes by the front or rear, to the point where it disappears again on the other side.

SUMMARY OF THE INVENTION

It is the task of this invention to resolve these issues, at least partially. In particular, its aim is to provide a simple and reasonably-priced driver assistance system and vehicle exhibiting at least one driver assistance system capable of monitoring the cross-traffic relative to said vehicle as reliably as possible.

It goes without saying that features and details described in connection with the inventive driver assistance system apply equally to the inventive vehicle and vice versa, and that the declarations made with regard to individual aspects of either invention are, therefore, always of a reciprocal nature.

The inventive vehicle driver assistance system serves to monitor cross-traffic. A driver assistance system of this kind is equipped with a transmitting device for transmitting electromagnetic signals and a receiving device for receiving electromagnetic signals. A characteristic of the driver assistance system according to the invention is that the transmitting device monitors a kidney-shaped area via a first and a second monitoring direction.

A driver assistance system designed according to the invention is used to monitor cross-traffic, i.e. traffic flowing at an angle relative to the vehicle's own path. The cross-traffic may be flowing to the front or to the rear of the vehicle. Typical application situations would be e.g. at junctions, or when driving into/reversing out of parking spaces set at right angles to the road/curb, where monitoring of cross-traffic is of an advantage. The objective of the monitoring solution is to identify the cross-traffic before it enters the vehicle's path, i.e. into the vehicle's anticipated area of movement. To this end, the driver assistance system pertaining to this invention is able to monitor cross-traffic not only in the direction of travel but also appearing from the sides. Thanks to its kidney-shaped monitoring area, the transmitting device to which this invention relates does not give rise to a gap or blind spot between the areas swept at the sides of the vehicle and those at the front/rear. On the contrary, if cross-traffic emerges at the side of the vehicle, it can be tracked until appears in front of or behind the vehicle. This is an effective means of avoiding gaps appearing between the different monitoring areas and serves to enhance dramatically the level of safety provided by the assistance system pertaining to this invention.

In the context of this invention, a kidney-shaped monitoring area is understood to be a scanning area that has two principal monitoring directions relative to the vehicle's direction of travel. Whereas the sensors of conventional driver assistance systems are designed to project a single lobe or two distinct lobes, the solution described in the context of this invention is capable of monitoring a much more complex area. In other words, the two lobes converge to form a single area in the shape of a kidney rather than a lobe. The two monitoring directions mentioned should really be understood in relation to the vehicle's direction of travel or path. The direction of monitoring should be aligned preferably to the direction of travel. The second direction of monitoring is set at an angle to the first, and is aligned to the side of the vehicle, at the front or the rear. The two directions of monitoring are designed to perform a kidney-shaped sweep of the surrounding area in order to avoid a gap between the two directions.

The transmitting and receiving devices pertaining to this invention are designed, in particular, to send and receive radar signals. To this end, the transmitting device and/or the receiving device may e.g. exhibit a transmitter or a receiver. It goes without saying that this invention may incorporate more than one transmitter and/or more than one receiver.

The two directions of monitoring which, in the context of this invention, may also be termed the principal directions of monitoring of the kidney-shaped area are preferably set at an angle to one another. The angle is intended to be between approx. 30° and approx. 150°.

A driver assistance system of the kind relating to his invention may also exhibit a control device designed to evaluate reflected electromagnetic signals. Here too, it would be possible to configure the manner in which the electromagnetic signals are transmitted.

With a driver assistance system of the kind described in this invention, it can be of an advantage if the first monitoring direction and the second monitoring direction together span a monitoring angle of between approx. 30° and approx. 150°, preferably between approx. 60° and approx. 120°, and especially in the area around approx. 90°. In particular, the two monitoring directions are perpendicular to one another. With this driver assistance system, it is preferable to have just two monitoring directions and not three or more. This gives rise to an effective combination of beams for monitoring cross-traffic either approaching the sides of the vehicle or passing in front or behind it. In particular, this is an effective means of avoiding a gap or "blind spot" in the monitoring process. A driver assistance system of the kind described in the invention helps increase monitoring accuracy and thus the overall safety of the vehicle.

Of advantage also is the fact that the either of the two monitoring directions can be aligned parallel, or more or less parallel, to the direction of travel or path of the vehicle. If the driver assistance system is mounted on a vehicle, one of the two monitoring directions can be aligned parallel, or more or less parallel, to the direction of travel or path of the vehicle. This particular monitoring direction can be aligned to the front or rear of the vehicle in order to identify any cross-traffic that may already be directly in front or behind the vehicle. The second monitoring direction, which is aligned at an angle to the first, can then be used to monitor any cross-traffic approaching the sides of the vehicle. In this way, cross-traffic can be picked up the moment it enters the "lobe" of this second monitoring direction. Thus, cross-traffic is identified from the side before it actually crosses the front or rear of the vehicle. This means that the path of the vehicle can be adjusted in good time, avoiding a potential collision with cross-traffic and increasing general safety.

A benefit of the driver assistance system pursuant to the invention is that the transmitting device exhibits a single transmitter used to generate the kidney-shaped monitoring area. A single transmitter can be configured such as to generate complex structures for creating a kidney-shaped monitoring area. This is a particularly simple and cost-effective solution, which also allows the necessary dimensions of the driver assistance system to be reduced. Depending on preference, a driver assistance system can be provided which does not differ from known assistance systems—in particular from known radar sensor systems—in terms of size and form, and preferably with regard to cost.

A further benefit of the driver assistance system pursuant to the invention is that the extension of the kidney-shaped monitoring area in the first monitoring direction corresponds largely to the extension of the kidney-shaped monitoring area in the second monitoring direction. This extension refers to the reach of the monitoring area beyond the vehicle. In other words, the reach or monitoring distance covered in the first direction is essentially the same size as that covered in the second direction. This preferably leads to the creation of a symmetrical or near-symmetrical kidney-shaped monitoring area. This design produces benefits in terms of adjustability and control. In addition, a symmetrical or near-symmetrical kidney-shaped monitoring area is much simpler and cheaper to construct with a corresponding transmitting device.

Another object pertaining to this invention is a vehicle exhibiting at least one driver assistance system for monitoring cross-traffic that is equipped with a transmitting device for transmitting electromagnetic signals and a receiving device for receiving electromagnetic signals. The vehicle described in the invention is characterized by the fact that the transmitting device scans a kidney-shaped area in an initial monitoring direction and also in a second monitoring direction. The vehicle featured in the invention is preferably equipped with the driver assistance system pertaining to this invention. Thus, a vehicle pertaining to the invention provides the same advantages as those detailed in reference to the inventive driver assistance system.

If two or more driver assistance systems are used, these should be identical in configuration. In particular, if two or four assistance systems are installed, i.e. one system for each corner of the vehicle, an identical design and configuration is of great advantage. This helps to cut costs for the system as a whole, while reducing the time and effort required for adjusting the different elements.

A vehicle pursuant to the invention can thus be further developed such that at least one driver assistance system is mounted on one corner of the vehicle, especially one of the front corners of said vehicle. Mounting the system on one corner of the vehicle gives rise to a particularly favorable monitoring structure insofar as it allows the first monitoring direction to be set up in front of the vehicle in the direction of travel, while the second points outwards away from the sides of the vehicle. This is an effective and above all comprehensive means of monitoring any cross-traffic that is either approaching the sides of the vehicle or passing in front or behind it. The system can be mounted e.g. on the corner of the vehicle's bumper bar—the outermost corner of the vehicle's external dimensions. Either of the two front corners, i.e. front right or front left, is preferable so that cross-traffic passing in front of the vehicle can be identified. As an alternative, additional driver assistance systems can, of course, be fitted to the two rear corners of the vehicle, i.e. rear right or rear left. Optimum configuration of the system pertaining to the invention would feature driver assistance systems fitted to each corner of the vehicle to provide comprehensive scanning of the areas both to the front and to the rear of the vehicle, and to allow cross-traffic to be tracked from the moment it emerges on one side of the vehicle to the point where it disappears on the other side after passing by.

Also of benefit is a vehicle pursuant to the invention that is equipped with at least two driver assistance systems, whereby these systems are configured and arranged on the vehicle in such a manner as to allow sections of the kidney-shaped monitoring areas to overlap in an overlap area. This gives rise to a certain redundancy, as parts of one monitoring area will already have been scanned by the neighboring sweep. That said, this overlap gives rise to a considerable degree of safety when it comes to monitoring cross-traffic. In particular, an overlap between the driver assistance systems on the sides of the vehicle, i.e. between the system on the left and the system on the right, will help to avoid a blind spot occurring directly in front of or behind the vehicle in the case of traffic traveling from left to right across the vehicle's path. This is a cost-effective, simple way to achieve a degree of monitoring redundancy that leads to greater overall safety.

It is also advantageous to have at least one driver assistance system mounted on each of the four corners of the vehicle featured in the invention, as this results in an overlap of neighboring kidney-shaped monitoring areas. This all-round vision results in the aforementioned redundancy and helps to increase overall safety. The invention thus allows cross-traffic passing in front of, behind, and to the side of a vehicle to be detected with a high degree of reliability.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 2:
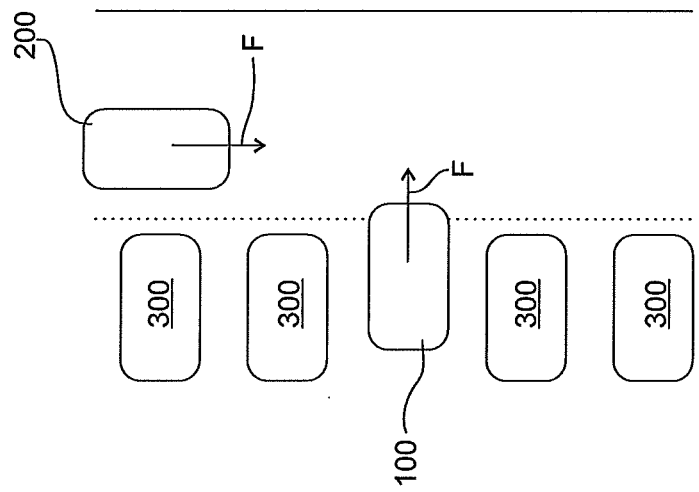
FIG. 2 A further scenario for monitoring cross-traffic.
Figure 1:
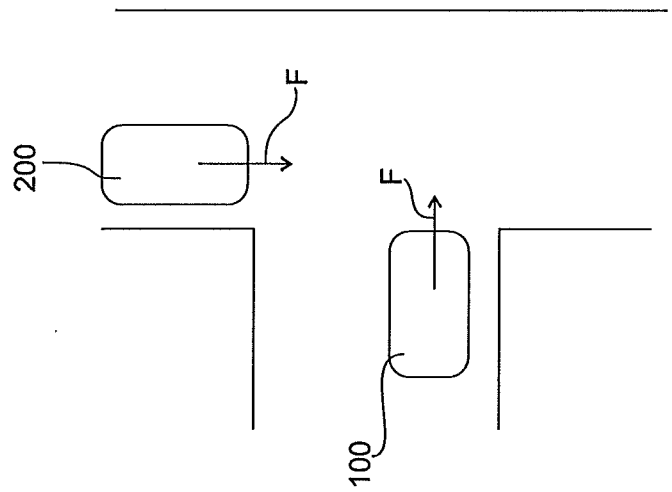
FIG. 1 An initial scenario for monitoring cross-traffic.

FIGS. 1 and 2 depict two application scenarios for the driver assistance system (10) pertaining to the invention. FIG. 1 shows a potential situation at a junction where a vehicle (100) traveling in direction (F) wishes to turn right onto a main road. FIG. 1 shows cross-traffic (200) moving from top to bottom in direction (F) as it approaches a vehicle (100) traveling in direction (F) from the left. The respective paths of vehicle (200) and vehicle (100) will cross and there would be a collision were not one of the drivers to brake and reduce his/her speed in good time. A driver assistance system (10) pursuant to this invention would detect the cross-traffic (200) in the scenario depicted in FIG. 1. A warning could be given and the speed of vehicle (100) automatically adjusted in order to avoid a collision with the cross-traffic (200).

FIG. 2 shows another scenario where monitoring the cross-traffic (200) could be an advantage, i.e. when driving into/reversing out of a parking space set at right angles to the main road; in this case, a vehicle (100) is wedged in a space between several parked cars (300). Path (F) is the direction of travel of vehicle (100) as it attempts to reverse out of a parking space between several parked cars (300).

Cross-traffic (200) is approaching at right angles, traveling down the main road from the top and heading for a collision with vehicle (100). A driver assistance system (10) pursuant to this invention would detect the cross-traffic (200) in the scenario shown in FIG. 2 and either issue a warning to the driver or take counter-measures in good time. The cross-traffic (200) can be detected in good time and a collision avoided.

Figure 3:
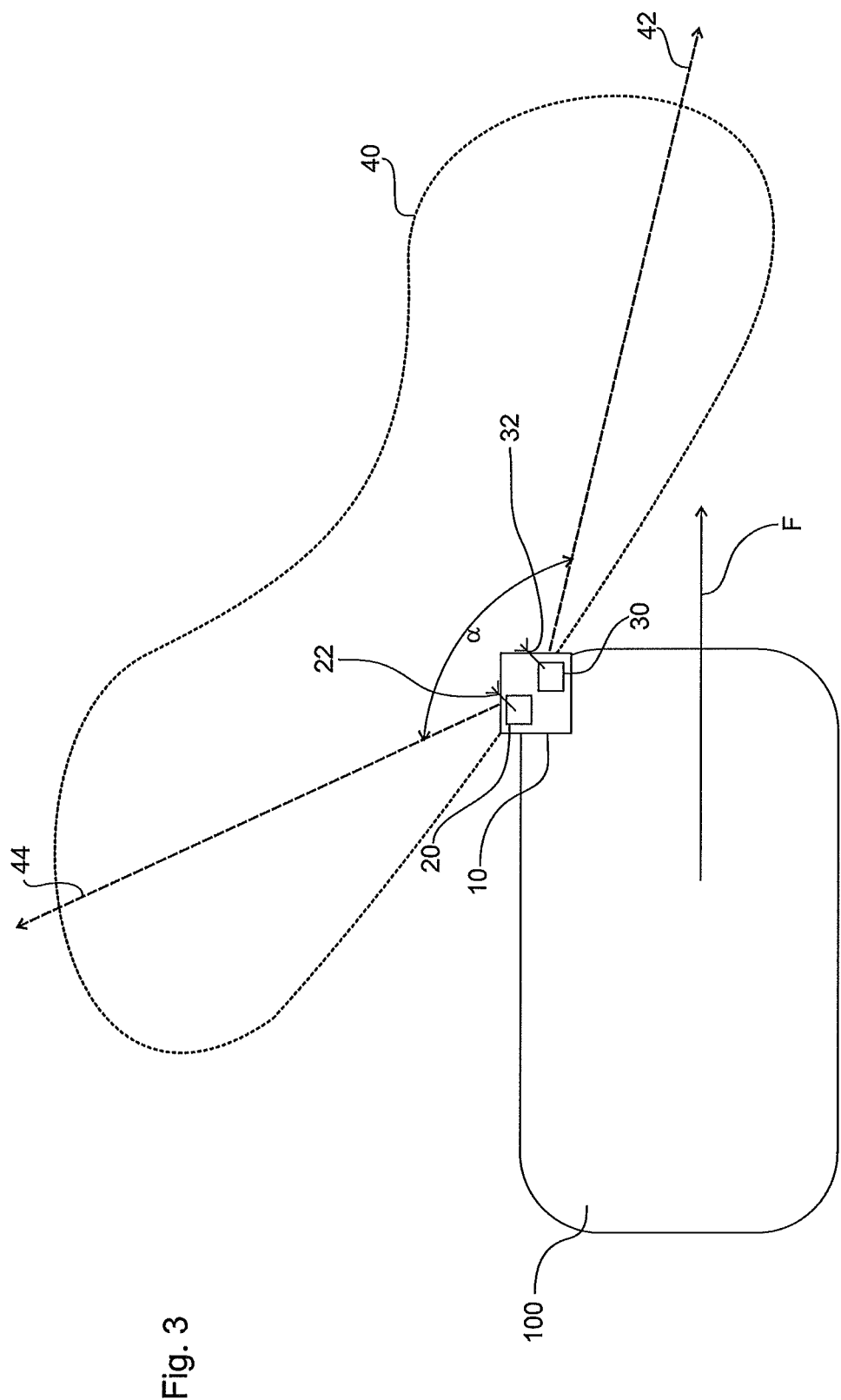
FIG. 3 Design of a vehicle as per the invention, featuring one driver assistance system pursuant to the invention, and FIG. 4 A further design form for a vehicle pursuant to the invention featuring four driver assistance systems.

FIG. 3 shows an initial design form of the driver assistance system (10) equipped with a transmitting device (20) and a receiving device (30) for electromagnetic signals. The transmitting device (20) is fitted with a single transmitter (22) for sending electromagnetic signals. The receiving device (30) is fitted with a single receiver (32) for receiving electromagnetic signals. The entire driver assistance system (10) is designed to generate a kidney-shaped monitoring area (40), as depicted in FIG. 3. As clearly depicted in FIG. 3, the kidney-shaped monitoring area (40) is shaped like an oval with an inward curve at one side. The two ends of the kidney are extended over two monitoring directions (42) and (44). Since there is no gap between the two monitoring directions (42) and (44), any cross-traffic (200) is monitored for the entire duration of its passage across the vehicle.

As FIG. 3 clearly shows, the two monitoring directions (42) and (44) are set at an angle to one another. Together, they span a monitoring angle ($\alpha$) of approx. 140° in this design form. In this example, the first monitoring direction (42) is even aligned beyond and across the vehicle's (100) direction of travel (F). Thus, the first monitoring direction (42) scans the area in front of vehicle (100), while the second (44) scans the area to the left or front-left of the vehicle.

If a driver assistance system (10) in the design form depicted in FIG. 3 is used in a vehicle (100), it need not be installed on just one corner 110a, 110b, 120a or 120b of the vehicle.

Figure 4:
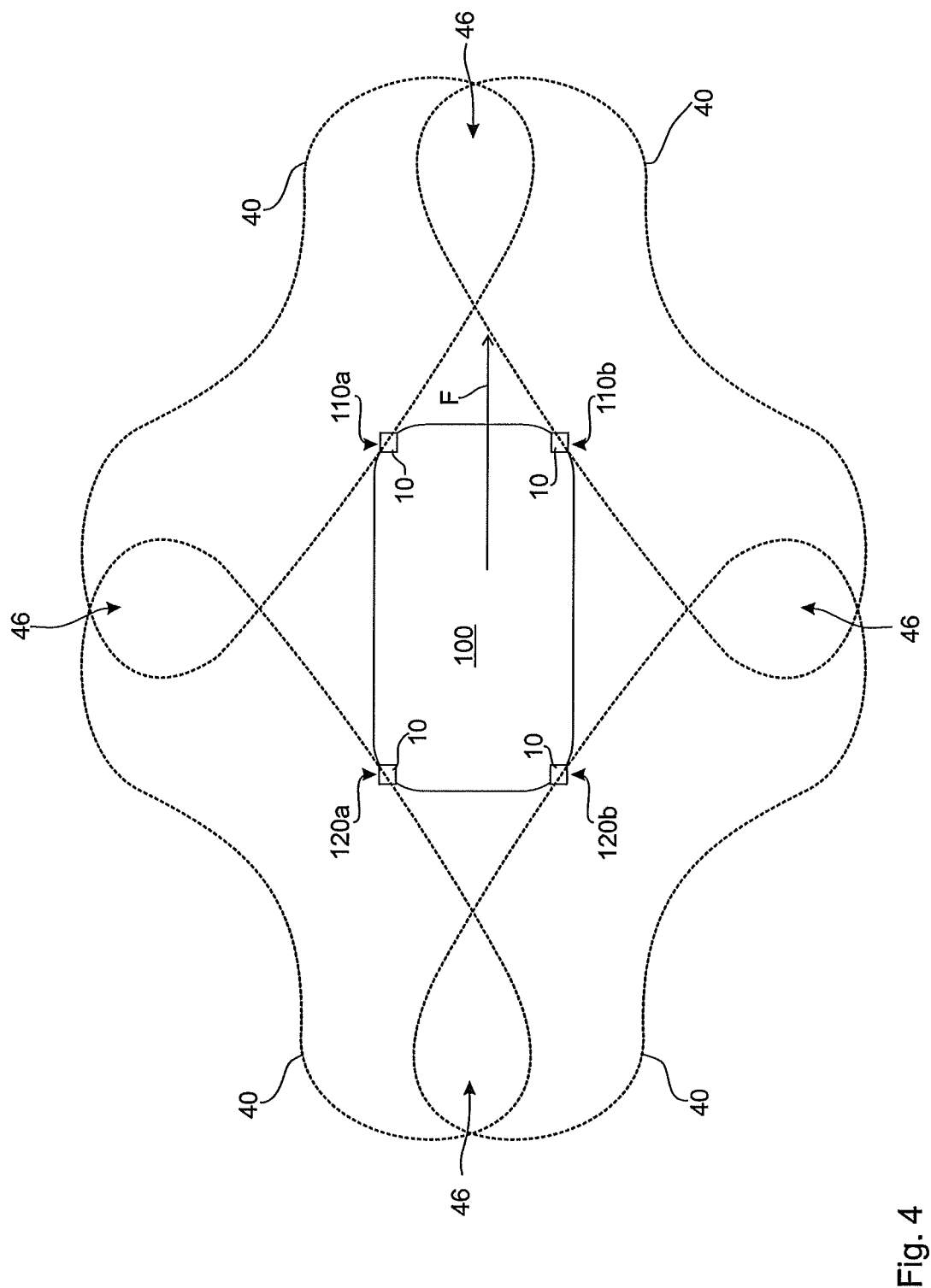

For example, FIG. 4 shows a vehicle (100) pertaining to the invention with the driver assistance system (10) mounted on all four corners 120a, 120b, 110a and 110b. These individual driver assistance systems (10) can be designed as shown in FIG. 3.

This means that 360° monitoring of the vehicle can (100) be achieved. This results in a certain redundancy in the form of overlap (46) between the individual neighboring monitoring areas (40). This overlap (46) helps to avoid gaps or blind spots between neighboring monitoring areas, thus optimizing the reliability of the results still further.

If a vehicle (100) equipped with a driver assistance system finds itself in a scenario similar to the one depicted in FIG. 1 or 2, the monitoring process would develop as follows. The cross-traffic (200) is identified while still at the left front or left rear side of the vehicle (100). At this stage, there is still time for the vehicle to take corrective action or for a warning to be issued to the driver. The cross traffic (200) is monitored continuously as it gradually approaches the vehicle (100). Indeed, the monitoring process can be continued until the offending traffic has safely passed to the front right side or rear right side of the vehicle and the risk of collision is averted. This essentially guarantees seamless monitoring of the cross-traffic (200), so that a collision warning can be given or corrective action taken in good time.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE SIGNS

10 Driver assistance system
20 Transmitting device
22 Transmitter
30 Receiving device
32 Receiver 40 Kidney-shaped monitoring area
42 Initial monitoring direction
44 Second monitoring direction
46 Overlap
100 Vehicle
110a Front corner
110b Front corner
120a Rear corner
120b Rear corner
200 Cross-traffic
300 Parked vehicles
α Monitoring angle
F Vehicle path

The invention claimed is:

1. A driver assistance system for a vehicle for monitoring cross-traffic, comprising:
   a transmitting device for simultaneously transmitting electromagnetic signals and operable for monitoring a kidney-shaped area, said kidney-shaped area being formed as an oval but with an inward curve at one side of the area opposite the transmitting device, said kidney-shaped area extending in both a first monitoring direction and in a second monitoring direction, said kidney-shaped area formed by the convergence of two lobes, each of the first lobe and second lobe being generated by said transmitting device, with a first lobe extending generally in the direction of travel of the vehicle and a second lobe extending generally at an angle to the side of the vehicle; and
   a receiving device for receiving electromagnetic signals.

2. The driver assistance system pursuant to claim 1, wherein the first monitoring direction and the second monitoring direction together span an open monitoring angle of between 30° and 150°.

3. The driver assistance system pursuant to claim 2, wherein at least one of the first and second monitoring directions is aligned parallel to a direction of travel or path of the vehicle.

4. The driver assistance system pursuant to claim 1, wherein the transmitting device comprises a single transmitter which generates the kidney-shaped monitoring area.

5. The driver assistance system pursuant to claim 1, wherein said transmitting device is operable for monitoring a first extension of the kidney-shaped monitoring area in the first monitoring direction and a second extension of the kidney-shaped monitoring area in the second monitoring direction, wherein said first extension corresponds to said second extension.

6. A vehicle, exhibiting at least one driver assistance system for monitoring cross-traffic, comprising:
   a transmitting device operable for simultaneously transmitting electromagnetic signals, wherein the transmitting device is operable for monitoring a kidney-shaped area, said kidney-shaped area being formed as an oval but with an inward curve at one side of the area opposite the transmitting device, said kidney-shaped area extending in both an initial monitoring direction and a second monitoring direction, said kidney-shaped area formed by the convergence of two lobes, each of the first lobe and second lobe being generated by said transmitting device, with a first lobe extending generally in the direction of travel of the vehicle and a second lobe extending generally at an angle to the side of the vehicle; and
   a receiving device for receiving electromagnetic signals.

7. The vehicle pursuant to claim 6 above, wherein the first monitoring direction and the second monitoring direction together span an open monitoring angle of between 30° and 150°.

8. The vehicle pursuant to claim 6 wherein the at least one driver assistance system is located on a corner of said vehicle, in particular on a front corner of said vehicle.

9. The vehicle pursuant to claim 6 further comprising at least a second driver assistance systems wherein said two driver assistance systems are arranged on the vehicle such that sections of the respective kidney-shaped monitoring areas of the two driver assistance systems overlap in at least one overlap area.

10. The vehicle pursuant to claim 6 wherein each corner of the vehicle is provided with at least one driver assistance system and wherein the respective kidney-shaped monitoring areas of adjacent driver assistance systems overlap in at least one overlap area.

11. The driver assistance system pursuant to claim 1, wherein the first monitoring direction and the second monitoring direction together span a monitoring angle of between 60° and 120°.

12. The driver assistance system pursuant to claim 1, wherein the first monitoring direction and the second monitoring direction together span a monitoring angle approximately 90°.

13. The vehicle pursuant to claim 8, wherein the at least one driver assistance system is located on a front corner of said vehicle.

14. The vehicle pursuant to claim 6, wherein the first monitoring direction and the second monitoring direction together span a monitoring angle of between 60° and 120°.

15. The vehicle pursuant to claim 6, wherein the first monitoring direction and the second monitoring direction together span a monitoring angle approximately 90°.

16. The vehicle pursuant to claim 7, wherein at least one of the first and second monitoring directions is aligned parallel to a direction of travel or path of the vehicle.

17. The vehicle pursuant to claim 6, wherein the transmitting device comprises a single transmitter which generates the kidney-shaped monitoring area.

18. The vehicle pursuant to claim 6, wherein said transmitting device is operable for monitoring a first extension of the kidney-shaped monitoring area in the first monitoring direction and a second extension of the kidney-shaped monitoring area in the second monitoring direction, wherein said first extension corresponds to said second extension.

* * * * *